United States Patent
Frigo et al.

(10) Patent No.: US 6,577,422 B1
(45) Date of Patent: Jun. 10, 2003

(54) LONG REACH DELIVERY OF BROADCAST SERVICES USING BROADBAND OPTICAL SOURCES AND PRE-COMPENSATION DISPERSION

(75) Inventors: Nicholas J. Frigo, Red Bank, NJ (US); Patrick P. Iannone, Red Bank, NJ (US); Kenneth C. Reichmann, Hamilton Square, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/252,860

(22) Filed: Feb. 18, 1999

Related U.S. Application Data

(60) Provisional application No. 60/075,602, filed on Feb. 18, 1998.

(51) Int. Cl.[7] .............................................. H04B 10/00
(52) U.S. Cl. .................... 359/161; 359/125; 359/137; 359/127; 359/130; 359/173
(58) Field of Search .................................. 359/125, 127, 359/130, 161, 173, 137

(56) References Cited

U.S. PATENT DOCUMENTS

| | | | |
|---|---|---|---|
| 4,653,915 A | 3/1987 | Frigo et al. | |
| 4,761,049 A | 8/1988 | Burns et al. | |
| 4,776,700 A | 10/1988 | Frigo | |
| 5,202,780 A | * 4/1993 | Fussanger | 359/125 |
| 5,502,587 A | 3/1996 | Frigo | |
| 5,504,606 A | 4/1996 | Frigo | |
| 5,521,734 A | 5/1996 | Frigo | |
| 5,541,757 A | * 7/1996 | Fuse et al. | 359/125 |
| 5,559,624 A | 9/1996 | Darcie et al. | |
| 5,574,584 A | 11/1996 | Darcie et al. | |
| 5,625,733 A | 4/1997 | Frigo et al. | |
| 5,659,351 A | * 8/1997 | Huber | 348/7 |
| 5,680,234 A | 10/1997 | Darcie et al. | |
| 5,694,234 A | 12/1997 | Darcie et al. | |
| 5,708,753 A | 1/1998 | Frigo et al. | |
| 5,710,648 A | 1/1998 | Frigo | |
| 5,717,510 A | * 2/1998 | Ishikawa et al. | 359/161 |
| 5,742,414 A | 4/1998 | Frigo et al. | |
| 5,760,940 A | 6/1998 | Frigo | |
| 5,880,865 A | * 3/1999 | Lu et al. | 359/125 |
| 5,886,804 A | * 3/1999 | Onaka et al. | 359/161 |
| 5,887,093 A | * 3/1999 | Hansen et al. | 385/27 |
| 5,907,417 A | * 5/1999 | Darcie et al. | 359/110 |
| 5,969,836 A | * 10/1999 | Foltzer | 359/114 |
| 6,031,645 A | * 2/2000 | Ichikawa | 359/113 |
| 6,151,144 A | * 11/2000 | Knox | 359/125 |
| 6,271,947 B1 | * 8/2001 | Iannone et al. | 359/124 |
| 6,295,148 B1 | * 9/2001 | Atlas | 359/125 |

OTHER PUBLICATIONS

Frigo, Nicholas J., "A Survey of Fiber Optics in Local Access Architectures," Optical Fiber Telelcommunications, vol. IIIA, Chapter 13, pp. 461–522, 1997.

Frigo, Nicholas J., Local Access Optical Networks, IEEE Network, pp. 32–36, Nov./Dec. 1996.

Schwartz, Mischa, Telelcommunication Networks: Protocols, Modeling and Abalysis, pp. 440–467, Addison–Wesley Publishing Company.

Frigo, N.J., et al., Fiber Optic Local Access Architectures, AT&T laboratories—Research, Tutorial ECOC'97, Sep. 22, 1997, 23 pp.

Frigo, N.J., "Passive Optical Networks in the Local Loop," Optics & Photonics News, pp. 25–29, Feb. 1996.

* cited by examiner

*Primary Examiner*—Leslie Pascal
*Assistant Examiner*—Hanh Phan

(57) ABSTRACT

A broadcast delivery system allows the delivery of broadband broadcast services over a WDM Passive Optical Network. These broadband services can be carried on optical broadband carriers or signals in a cost-effective manner by utilizing shared dispersion-compensated fiber (DCF) over a group of feeder lines or a group of PONs. A broadband optical signal is provided over a plurality of feeder lines. Each feeder line is connected to a remote node for distribution to subscribers. One dispersion-compensated fiber is shared for a plurality of feeder lines.

20 Claims, 10 Drawing Sheets

LONG REACH DELIVERY OF BROADCAST SERVICES USING BROADBAND OPTICAL SOURCES AND PRE-COMPENSATION DISPERSION

CROSS-REFERENCE TO RELATED APPLICATIONS

This application claims priority from U.S. Provisional Application Ser. No. 60/075,602 filed on Feb. 18, 1998 and incorporated by reference herein.

BACKGROUND OF THE INVENTION

The present invention relates to the field of optical communications, and more particularly, to the delivery of broadcast services using broadband optical sources and pre-compensation of dispersion.

The distribution of broadcast services over local access passive optical networks (PONs) that carry switched services was proposed years ago, see R. C. Menendez, S. S. Wagner, and H. L. Lemberg, "Passive Fiber Loop Architecture Providing Both Switched and Broadcast Transport," Electron. Lett., vol. 26, pp. 273–274 (1990). This topic was re-examined recently, see P. P. Iannone, K. C. Reichmann, and N. J. Frigo, "Broadcast Digital Video Delivered over WDM Passive Optical Networks," IEEE Phot. Technol. Lett., vol. 8, pp. 930–932 (1996), largely due to the emergence of Waveguide Grating Routers (WGRs) with periodic transmission functions. See C. Dragone, "An N×N Optical Multiplexer Using a Planar Arrangement of Two Star Couplers," IEEE Phot. Technol. Lett., vol. 3, pp. 812–815 (1991); and M. K. Smit, "New Focusing and Dispersive Planar Component Based on an Optical Phased Array," Elect. Lett., vol. 24, pp. 385–386 (1988). Specifically, the properties of the WGR permit it to deliver both digital broadcast and switched services on the same fiber-optic infrastructure. Using sources with different spectral widths changes the character of a WDM PON from a point-to-point link (for line sources) to a broadcast star (for broadband optical sources), N. J. Frigo, K. C. Reichmann, and P. P. Iannone, "WDM Passive Optical Networks: A Robust and Flexible Infrastructure for Local Access," in Photonics Networks, G. Prati, ed., pp. 201–212, Springer-Verlag (1996). This attribute leads to a flexible way to provide different services and service types, simultaneously, over a single PON.

A shortcoming of this approach is that the communication band which is the most natural to use for such services is also the band that is the least tolerant of broad optical sources operating at high bandwidths. This band, the 1500 nm region, has the advantages of both low-loss transmission and ready availability of Erbium-Doped Fiber Amplifiers (EDFA) that make delivery of a common, broadcast, signal attractive. With these attractive features comes the disadvantage that there is a significant amount of dispersion when signals that are broadband both in information content (i.e. high modulation frequency content) and optical spectral content propagate on conventional optical fiber. This can limit the effective range of such systems to a few kilometers.

This dispersion penalty is fundamental for broadband sources and will apply to delivery of such signals regardless of whether delivered over a network with wavelength-division-multiplexing components or over a more conventional broadcast star. While dispersion compensating fiber (DCF) has been used in conventional long-haul optical transmission systems, it would be cost-prohibitive to use a DCF for each PON or feeder line of the distribution system.

Moreover, dispersion is not generally a problem for PONs because a line source (or laser) is typically used rather than a broadband source.

Therefore, there is a need for a technique to provide broadcast services over a WDM PON while economically compensating for dispersion.

SUMMARY OF THE INVENTION

A broadcast delivery system is provided that includes a plurality of passive optical networks (PONs), each PON includes at least an optical transmitter and a feeder line connected thereto. The system also includes a broadband optical source outputting a broadband optical signal. A dispersion compensating fiber has a first end connected to the broadband optical source and a second end connected to each of the plurality of PONs (or feeder lines). The dispersion compensating fiber dispersion compensates for each of the feeder lines in the plurality of PONs within an acceptable range. Therefore, a plurality or group of feeder lines are pre-compensated using one DCF to share the DCF plant costs across a larger number of subscribers.

DETAILED DESCRIPTION

Figure 1:
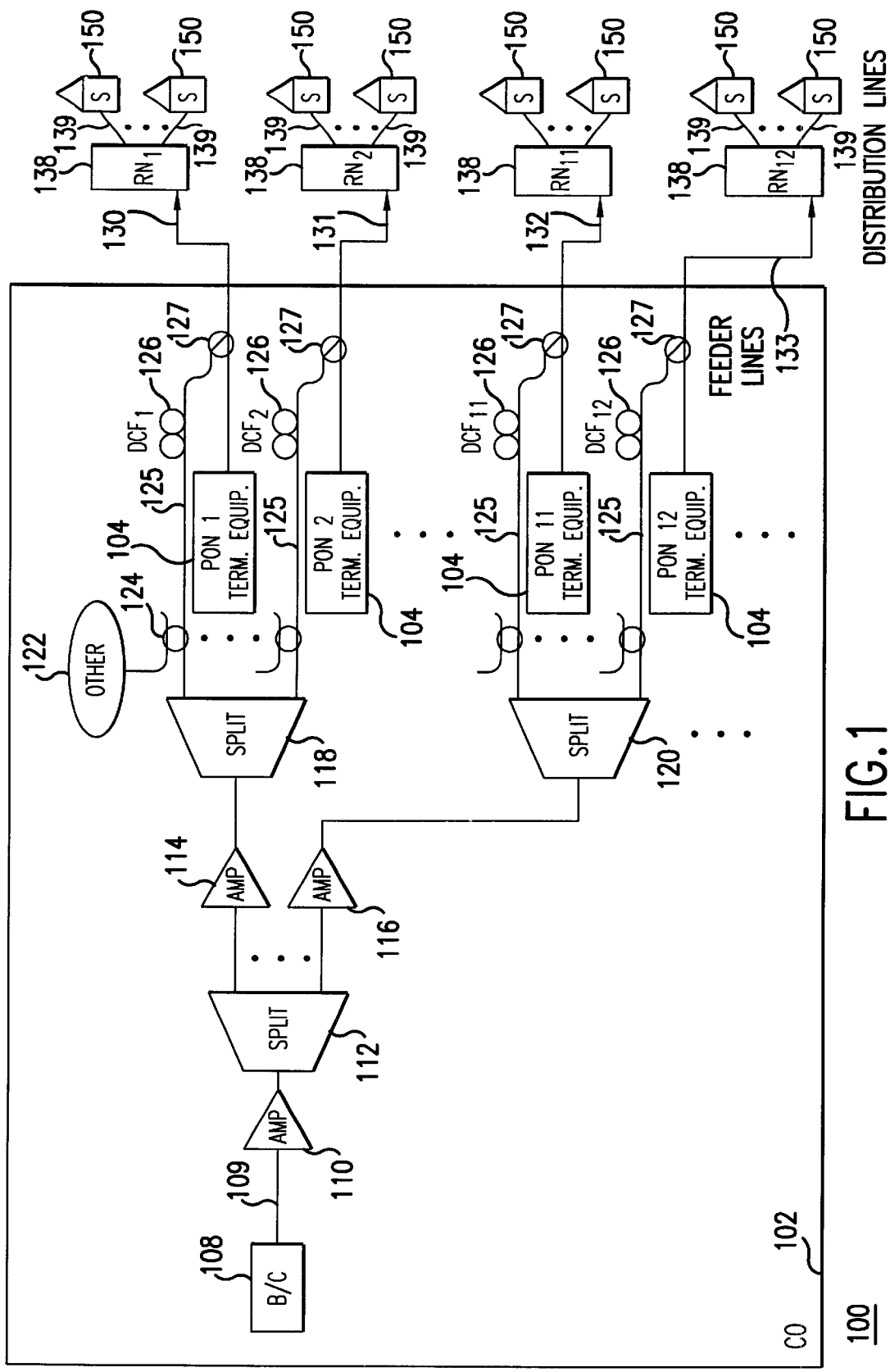
FIG. 1 is a block diagram illustrating a broadcast delivery system according to an embodiment of the present invention.

Referring to the drawings in detail, wherein like numerals indicate like elements, FIG. 1 is a block diagram illustrating a broadcast delivery system 100 according to an embodiment of the present invention. A Central Office (CO) 102 is the hub for many Passive Optical Networks (PONs). A PON is a combination of optical links and components. Several PONs are provided for delivering a set of services such as voice, data, high speed interactive video, etc. to subscribers 150. The services delivered by the PONs can be either a broadcast service (where all subscribers receive the same signal or information) or a switched service (where each subscriber receives an individually selected signal or information, such as telephony or voice services).

Figure 2:
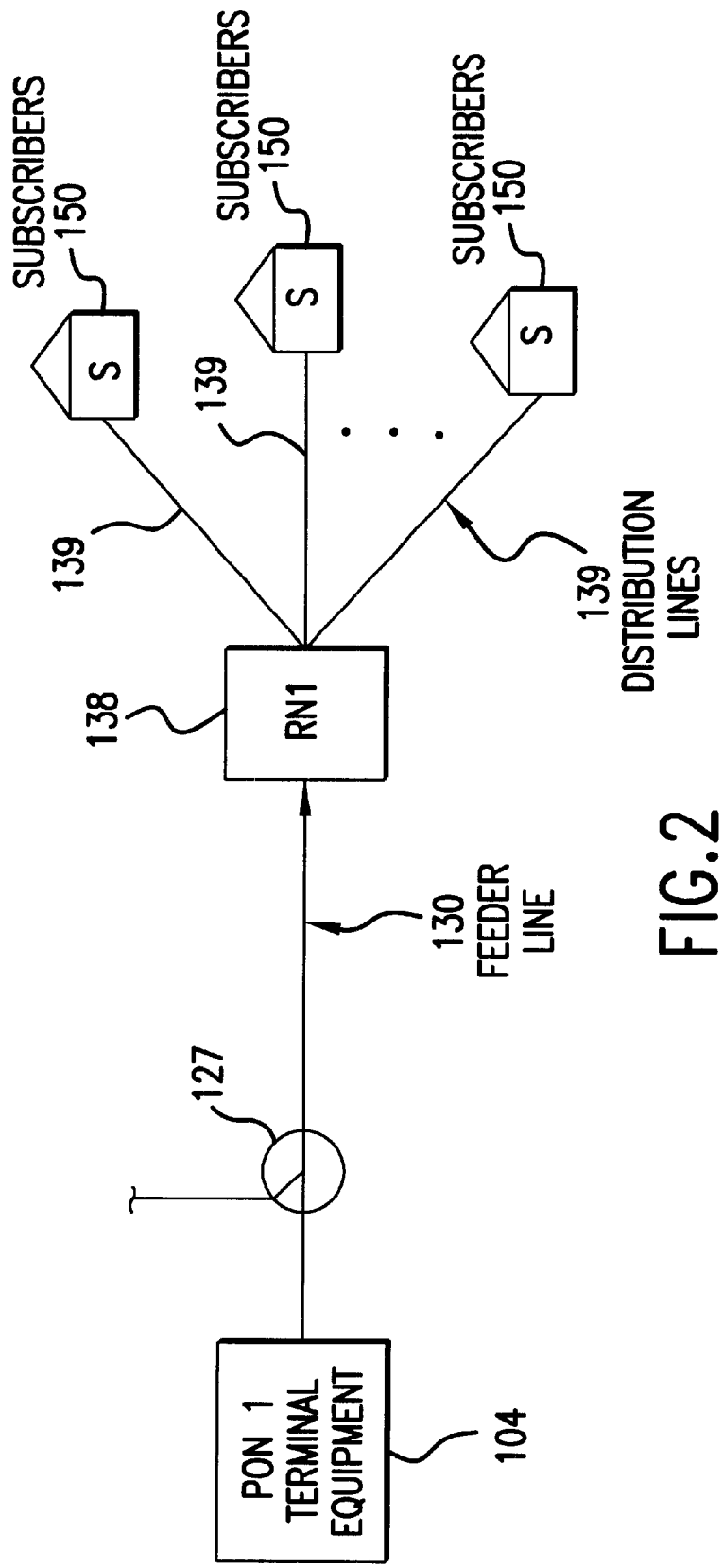
FIG. 2 is a block diagram of a passive optical network according to an embodiment of the present invention.

FIG. 2 is a block diagram illustrating a passive optical network (PON) according to an embodiment of the present invention. FIG. 2 provides just one example of a PON. Other PONs can include different optical components, link arrangements and architectures. Referring to FIG. 2, PON1 includes a PON terminal equipment 104, a remote node (RN1) 138, a feeder line 130 connecting the PON terminal equipment 104 to the RN 138 and a plurality of distribution lines 139. The PON may also include an optical service coupler 127 or other optical components. A plurality of subscribers 150 are connected to RN1 138 via distribution lines 139. According to an embodiment of the present invention, the subscribers 150 are not part of the PON. As shown in FIG. 1, the terminal equipment 104 and service coupler 127 are located within CO 102, while the remote nodes (RNs) 138 and subscribers 150 are remotely located from the CO 102. Each of the other PONs is very similar to PON1, and includes a PON terminal equipment 104, a feeder line, a RN 138 and one or more distribution lines 139.

Several PONs are shown in the broadcast delivery system 100 of FIG. 1. While only 12 PONs are shown in FIG. 1, it should be understood that any number of PONS can be provided in system 100. The PONs may deliver a set of services such as voice, data, high speed interactive video, etc., under the supervision of the CO 102 to one or more subscribers 150. To help offset the cost of this high quality network, the owners of the CO 102 may wish to augment their income by a "resale" (internal or external) of the optical spectrum for one or more broadcast services to the subscribers 150, such as broadcast video services (e.g., television programs, movies), broadcast audio services (e.g., broadcast radio), data and other services delivered over broadcast networks. See U.S. Pat. No. 5,742,414, hereby incorporated by reference, for additional information on providing a multiplicity of services via WDM devices. These services can be introduced as an optical overlay to the one or more existing PONs 104, thereby reusing the existing optical infrastructure.

Referring to FIG. 1, the source of the broadcast data or services (the broadcast source) B/C 108 can be derived by satellite, high speed link, pre-recording, on-site generation, Internet Service Provider (ISP), for example, and outputs a modulated optical signal (e.g., a modulated broadband optical carrier signal) onto line 109. Broadcast source 108 is a broadband source because it may have a frequency range that is wider than the free-spectral range (e.g., several nanometers and greater) of the Wavelength Division Multiplexing (WDM) devices described herein. On the other hand, line sources, such as a laser, generally emit light in essentially single optical modes, and have a relatively narrow frequency range (e.g., a fraction of a nm). Several broadcast sources 108 can be provided instead of a single broadcast source.

The modulated broadband optical signal is then optically amplified by amplifier 110 and then split by splitter 112. The broadband broadcast signal is then further amplified by optical amplifiers 114 and 116 and further split by splitters 118 and 120. According to an embodiment of the present invention, splitters 112, 118 and 120 are advantageously power splitters. Each of the power splitters 112, 118 and 120 duplicates or replicates the input signal onto one or more output signals (e.g., each of the output signals has identical modulated information and frequency content as the input signal, but each of the output signals is typically lower in power than the input signal). Unless otherwise noted herein, all splitters can be power splitters, such as splitter 112.

Splitters 118 and 120 each include multiple outputs, which provide the broadcast broadband signal. Each output of splitters 118 and 120 is connected via a respective line 125 to an input of a corresponding dispersion compensating fiber (DCF) 126.

The broadcast delivery system may also include a plurality of optical service couplers 127. Each service coupler 127 may be a WDM device, or the like. Each service coupler 127 connects an output of a DCF 126 to a corresponding PON. For example, DCF1 is connected via coupler 127 to feeder line 130 of PON1, DCF2 is connected to feeder line 131 of PON2 via a coupler 127, DCF 11 is connected to feeder line 132 of PON 11, . . . and DCF12 is connected to feeder line 133 of PON 12 via a coupler 127.

As used herein, the terms "connected" or "connecting" mean either directly connecting (without other elements interposed) or indirectly connecting (i.e., with other elements interposed). The terms "connecting" or "connected" can include a variety of connection types, such as electrically connecting and optical coupling, as examples.

Figure 3:
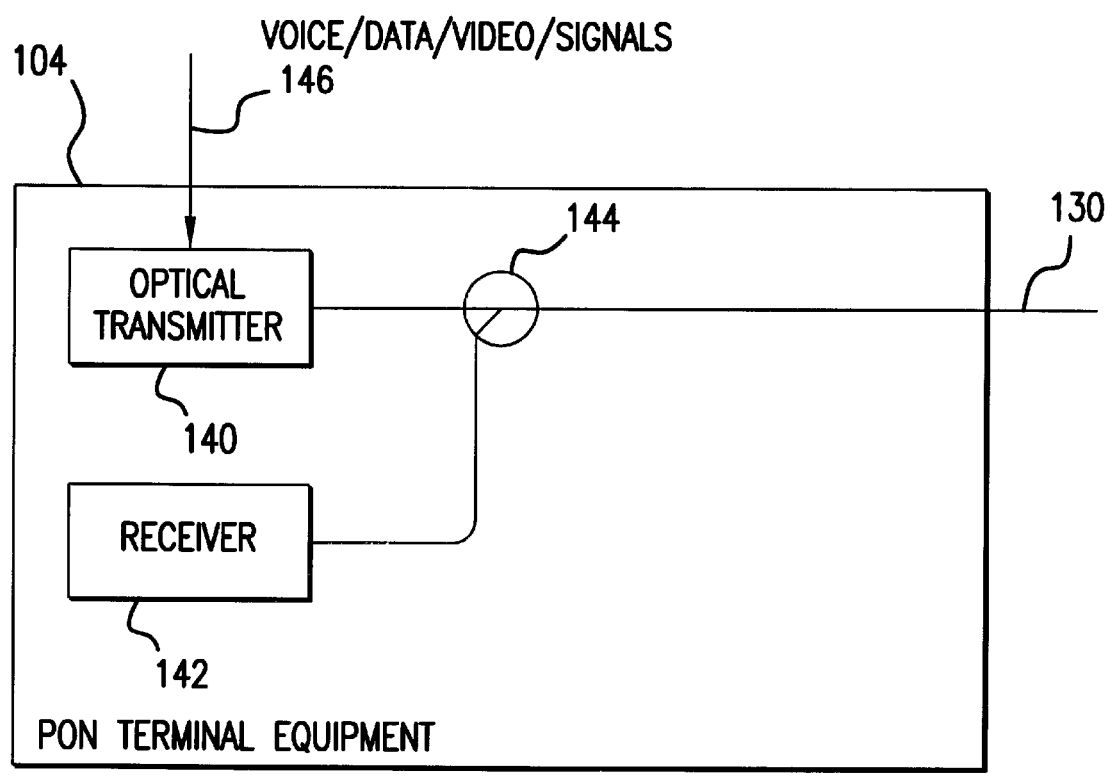
FIG. 3 is a block diagram illustrating a terminal equipment for a passive optical network according to an embodiment of the present invention.

FIG. 3 is a block diagram of a PON terminal equipment 104 according to an embodiment of the present invention. PON Terminal equipment 104 receives voice, data and/or video signals (or the like) via line 146 to be delivered to a RN 138 (FIG. 1) via a feeder line 130 and then to one or more selected subscribers (150, FIG. 1). PON terminal equipment 104 includes an optical transmitter 140, such as a laser, LED or other optical source, an optional receiver 142 and optical coupler 144. Transmitter 140 and receiver 142 can perform an electrical-to-optical and optical-to-electrical signal conversion, respectively. Optical transmitter 140 generates a modulated optical signal based upon the signals provided via line 146 to provide services to subscribers. Although not shown, it should be understood that PON terminal equipment 104 can include additional optical components, such as a splitter for splitting the output signal from transmitter 140 into several output signals. Modem technology can provide transmitter 140, receiver 142 and optical coupler 144 on a single photonic integrated circuit.

Each remote node (RN) 138 distributes optical signals received via a feeder line (e.g., feeder line 130) onto one or more distribution lines 139. Each RN 138 can include one or more optical components. RN 138 can comprise a power splitter (similar to power splitter 112), a Wavelength Division Multiplexing (WDM) device, a Waveguide Grating Router (WGR), or other optical device. The WDM device and the WGR are described below in connection with FIGS. 4 and 5, respectively.

Figure 4:
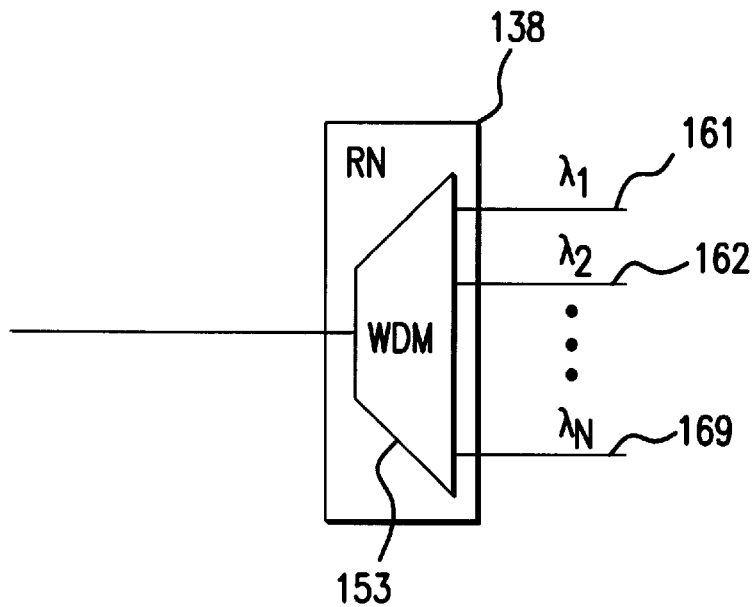
FIG. 4 is a block diagram illustrating a remote node according to an embodiment of the present invention.

FIG. 4 is a block diagram illustrating a remote node (RN) according to an embodiment of the present invention. According to an embodiment of the present invention illustrated in FIG. 4, each RN 138 includes a Wavelength Division Multiplexing (WDM) device 153. The WDM device 153 routes a received optical signal to an output port(s) as a function of wavelength of the input signal. Output ports 161, 162 . . . and 169 are shown in FIG. 4.

Figure 5:
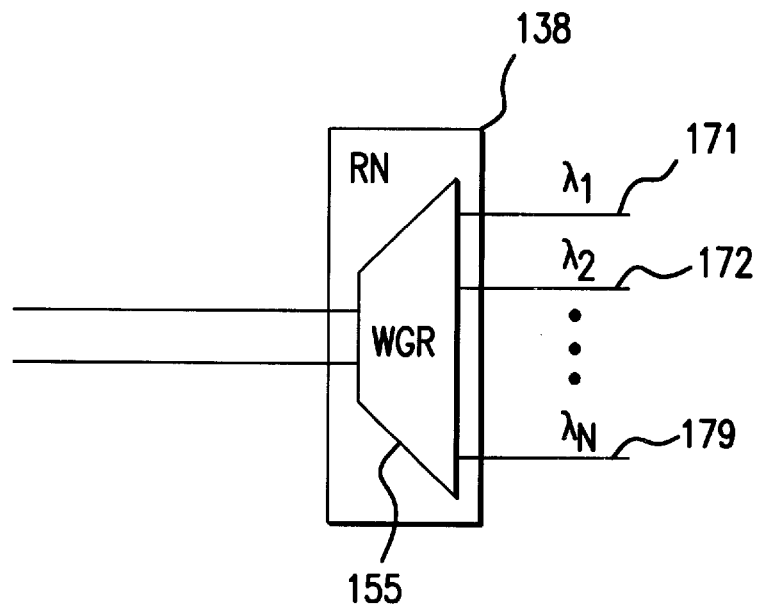
FIG. 5 is a block diagram illustrating a remote node according to another embodiment of the present invention.

FIG. 5 is a block diagram illustrating a remote node (RN) according to another embodiment of the present invention. As shown in FIG. 5, RN 138 includes a Waveguide Grating Router (WGR) 155. WGR 155 spectrally slices and distributes received light by wavelength, or, spectrally combines selected portions of the broadband spectrum depending on broadcast direction. The WGR has several advantages. The WGR 155 can provide either a broadcast service or a switched service, depending on whether the optical transmission source is a broadband source or a line source (e.g., a laser). If a broadcast signal is input to the WGR 155 having a spectrum at least as wide as the free spectral range of the WGR 155, the WGR 155 spectrally slices the broadband signal. The spectrally sliced portions of the downstream broadband signal are distributed along output fiber lines 171, 172, . . . 179 to subscribers based on frequency (or wavelength). Thus, WGR 155 can provide a broadcast service when the input signal is a broadband signal because each output fiber line receives the same information (on a different spectral slice or portion of the broadband signal). The WGR 155 can operate to provide a switched service when a line source or narrowband source is used since the WGR 155 will pass the narrow optical signal (from the line source) to one output port (or a limited number of output ports) based on wavelength of the optical signal, thereby establishing a point to point connection or switched service.

The WGR 155 splits incoming light into spectral constituents, launching them into a set of output fibers 171, 172, . . . 179, based on frequency or wavelength (a different wavelength provided on each output fiber). The WGR 155 includes a routing property and a periodicity property. The routing property is a generalization of the WDM property for more than one input port. Each optical frequency gives routing instructions that are independent of the input port (i.e., the output port is based only on the frequency of the input signal, not the input port). According to the periodicity property, by choice of design parameters, higher diffraction orders can be made to overlap lower orders to some extent. Thus, it is possible to design the grating in such a way that signals outside the range of the output ports of the WGR will "wrap around" and exit corresponding output ports. This periodicity property and the routing property enable more flexible and efficient architectures than conventional WDM devices.

Referring to FIG. 1, each of the RNs 138 is a known distance from the CO 102, and the length of the each feeder line (e.g., feeder lines 130, 131, 132 and 133), is usually much greater than that of the distribution links 139 between the RN 138 and the subscribers 150. Some of these feeder lines (e.g., 130, 131, 132, 133) will be long enough to cause significant dispersion penalties for the broadband broadcast service, and these are the penalties that should be compensated. Because the majority of the link length is attributed to the feeder line (e.g., feeder line 130), a high percentage of the dispersion would occur in the feeder line unless there was some compensation provided.

The approach in FIG. 1 uses a DCF 126 for each feeder line, tailoring it to produce a nearly dispersion-free link. This approach has the advantage that each DCF 126 is individualized to that particular link and provides a dispersion-free link for all services in the 1500 nm communication band in the future for that link. On the other hand, this approach may be costly because a separate DCF 126 is provided for each RN 138 and feeder line. A further advantage would be achieved if compensation was provided in a more cost-effective approach.

Figure 6A:
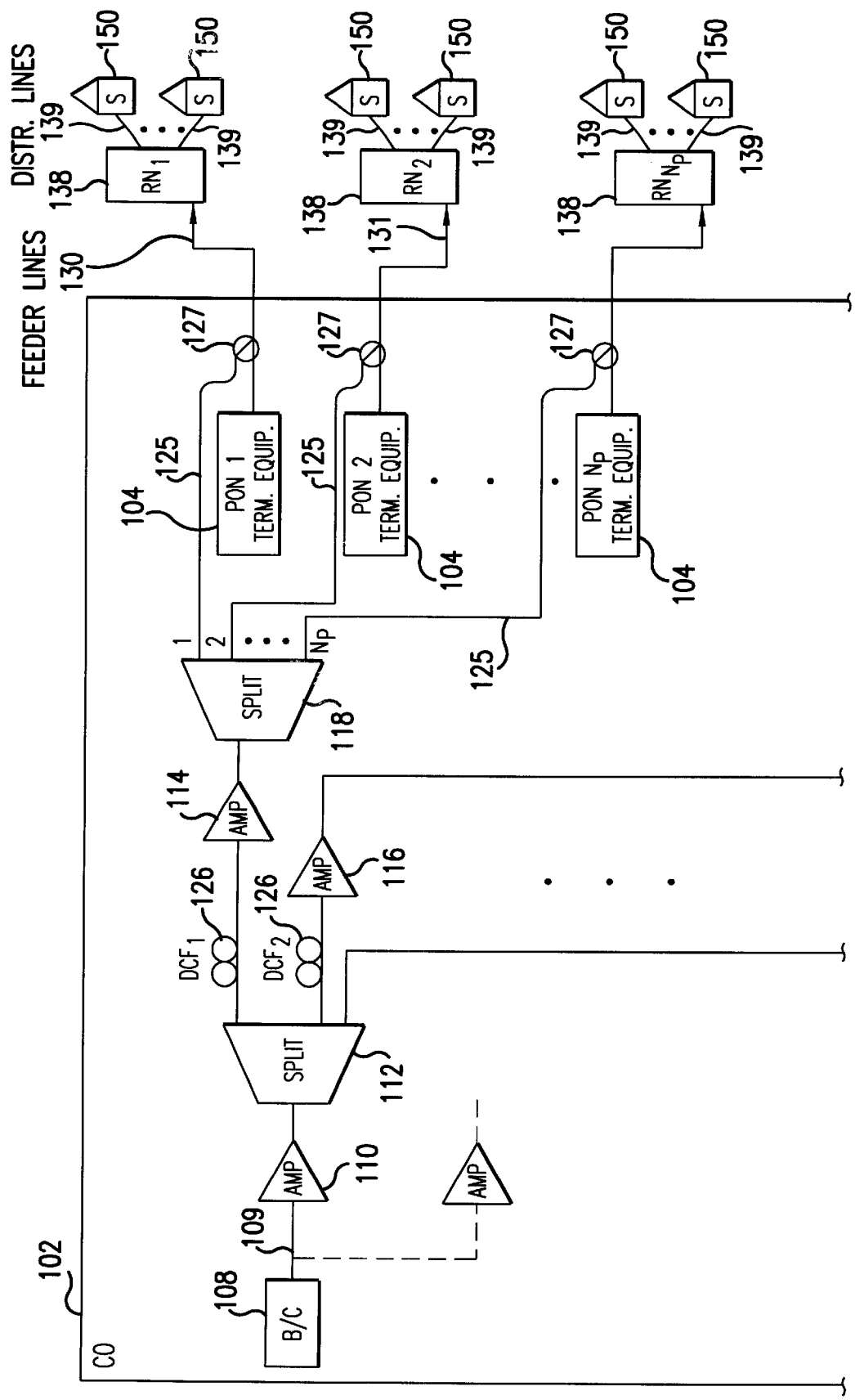
FIG. 6 is a block diagram illustrating a broadcast delivery system according to another embodiment of the present invention.
Figure 6B:
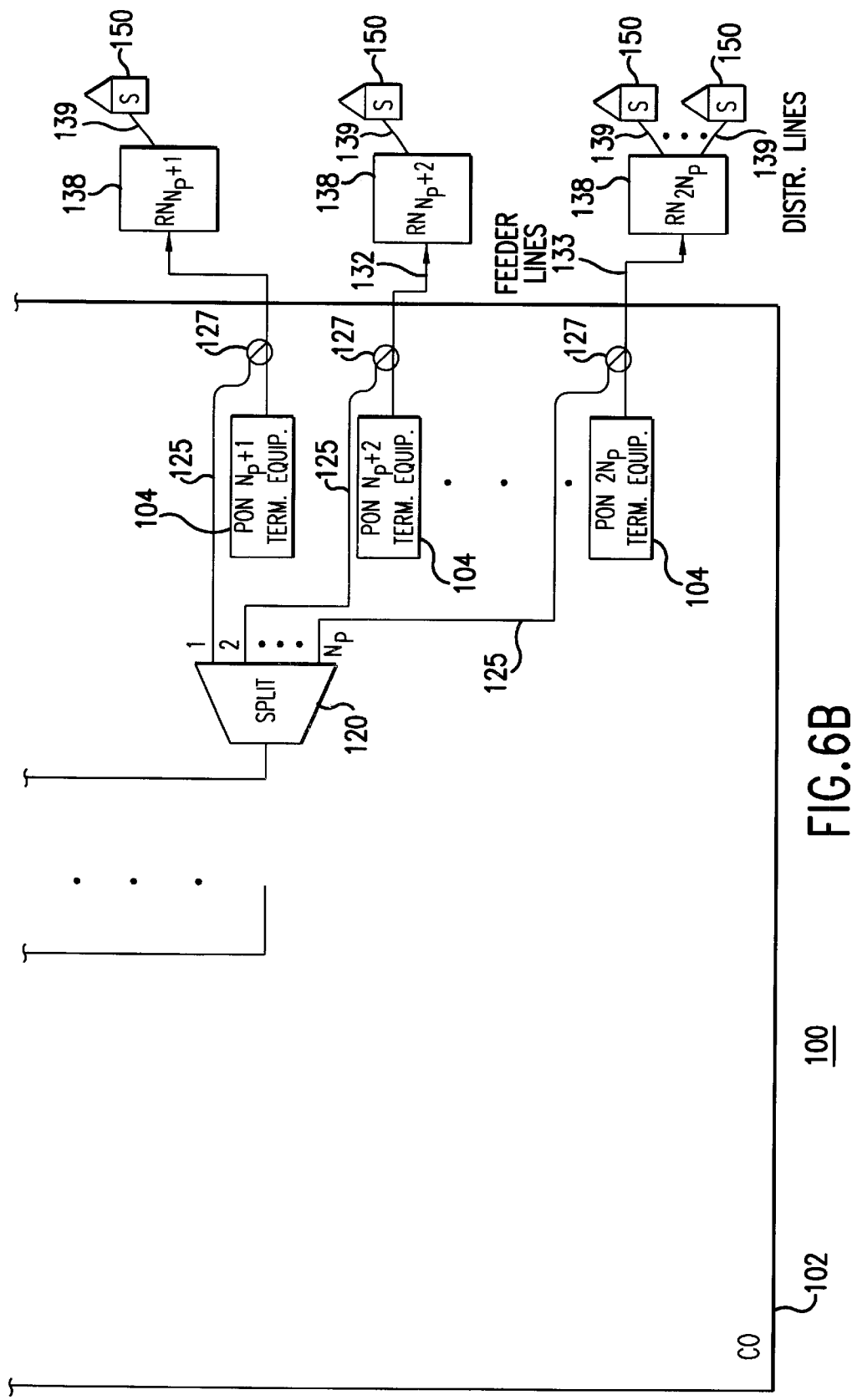

FIG. 6 is a block diagram illustrating a broadcast delivery system 100 according to another embodiment of the present invention and provides a more cost-effective approach. In this approach, the cost per subscriber is reduced by sharing the dispersion compensation and amplification plant costs over a larger number of users or subscribers, as compared to FIG. 1. This is made possible because the same broadband signal is broadcast or provided to all (or at least a group of) subscribers 150. In FIG. 5, DCFs 126 are connected to each output of splitter 112. For example, DCF1 is connected between splitter 112 and amplifier 114, while DCF2 is connected between splitter 112 and amplifier 116. The dispersion compensated broadband signals derived from the broadcast source 108 are amplified by optical amplifiers 114 and 116, and input to splitters 118 and 120, respectively. In this embodiment, splitters 118 and 120 each output $N_p$ output signals over lines 125, each output signal including the amplified dispersion compensated broadband signal. Each amplified dispersion compensated broadband signal output on lines 125 is connected to a respective PON using an optical service coupler 127. Each coupler 127 connects a splitter output to a feeder line (e.g., feeder lines 130, 131, 132, 133) of a corresponding PON. The feeder lines can be grouped together, sorted roughly by the lengths of the feeder lines or links (each having a roughly comparable dispersion as the others in the same group). A first group of feeder lines includes the feeder lines that are connected to splitter 118 (i.e., feeder lines 130, 131), and, therefore are pre-compensated by a common DCF 126 (DCF1). A second group of feeder lines includes the feeder lines connected to splitter 120 (i.e., feeder lines 132, 133 . . . ), and, therefore are pre-compensated by a common DCF 126 (DCF2). The length of the first group of feeder lines may differ substantially from the length of the second group of feeder lines because DCF1 and DCF2 can be tailored or individualized for the length(s) of feeder lines for their respective group.

As a result, DCF1 pre-compensates for dispersion for a first group of feeder lines, including the feeder lines of PON 1 (i.e., feeder line 130), PON 2 (i.e., feeder line 131), . . . , and PON $N_p$. Similarly, DCF2 pre-compensates for dispersion for a second group of feeder lines, including the feeder lines of PON $N_p$+1, PON $N_p$+2 (feeder line 132), . . . , and PON $2N_p$ (feeder line 133, FIG. 6). Thus, each DCF 126 pre-compensates for a plurality of feeder lines, rather than just compensating for a single feeder line (as in FIG. 1). In the embodiment of the present invention (e.g., FIG. 6), the DCF 126 may be considered to "pre-compensate" for dispersion in a plurality of links because the DCF 126 is connected before (or upstream from) the group of feeder lines.

In operation of the system of FIG. 6, the optical transmitter 140 (which may be a line source, such as a laser or a broadband source) in each PON terminal equipment 104 transmits an optical signal at one or more wavelengths, where each wavelength is routed by the WGR 155 of the RN 138 to one or more subscribers 150. Thus, with the optical transmitters 140 (FIG. 3) operating as line sources (such as a laser), WGR 155 (FIG. 5) of RN 138 operate to route a selected signal to each subscriber 150 (e.g., operating to provide a switched service). (Each PON can alternatively transmit a broadband broadcast signal as well.) At the same time, broadcast source 108 outputs a broadband broadcast signal. The broadband broadcast signal output from broadcast source 108 is pre-compensated for dispersion and is amplified. This amplified pre-compensated broadband signal is combined with the optical signals output from each PON via couplers 127. The WGR 155 operates to spectrally slice the pre-compensated broadband signal and provide a copy of the broadcast information to each subscriber 150 (over a different spectral slice or frequency of the broadband signal).

The cost-effectiveness of this scheme derives from the fact that DCF1 can pre-compensate a range of link lengths to within an acceptable level. Links on the shorter side of the nominal compensation length for DCF1 will be slightly over-compensated, while links on the longer side of the nominal compensation length for DCF1 will be slightly under-compensated, but as long as the total dispersion penalty is modest, all the links within that compensation span will be effectively compensated by DCF1. The purpose, then, of amplifier 114 is to serve PONs 1–$N_p$, each passing (serving) M subscribers, so that the cost of DCF1 and amplifier 114 is divided by (MN$_p$) subscribers. Since the number of links of a nominal length increases linearly with that nominal length (assuming uniform population density) there may be several stages of amplification and splitting possible at the level of amplifier 114. That is, instead of amplifier 114 serving N$_p$ PONs, it may serve N$_p$ other amplifiers, each serving N$_p$ PONs. The service area, population density, permissible dispersion penalty, and so forth, will determine the economics of the splitting, but it is clear that this scheme can render the cost of DCF1 insignificant as compared to the unshared costs of the subscriber terminals (for homes served) and the couplers 127 used to effect the overlay.

Figure 7:
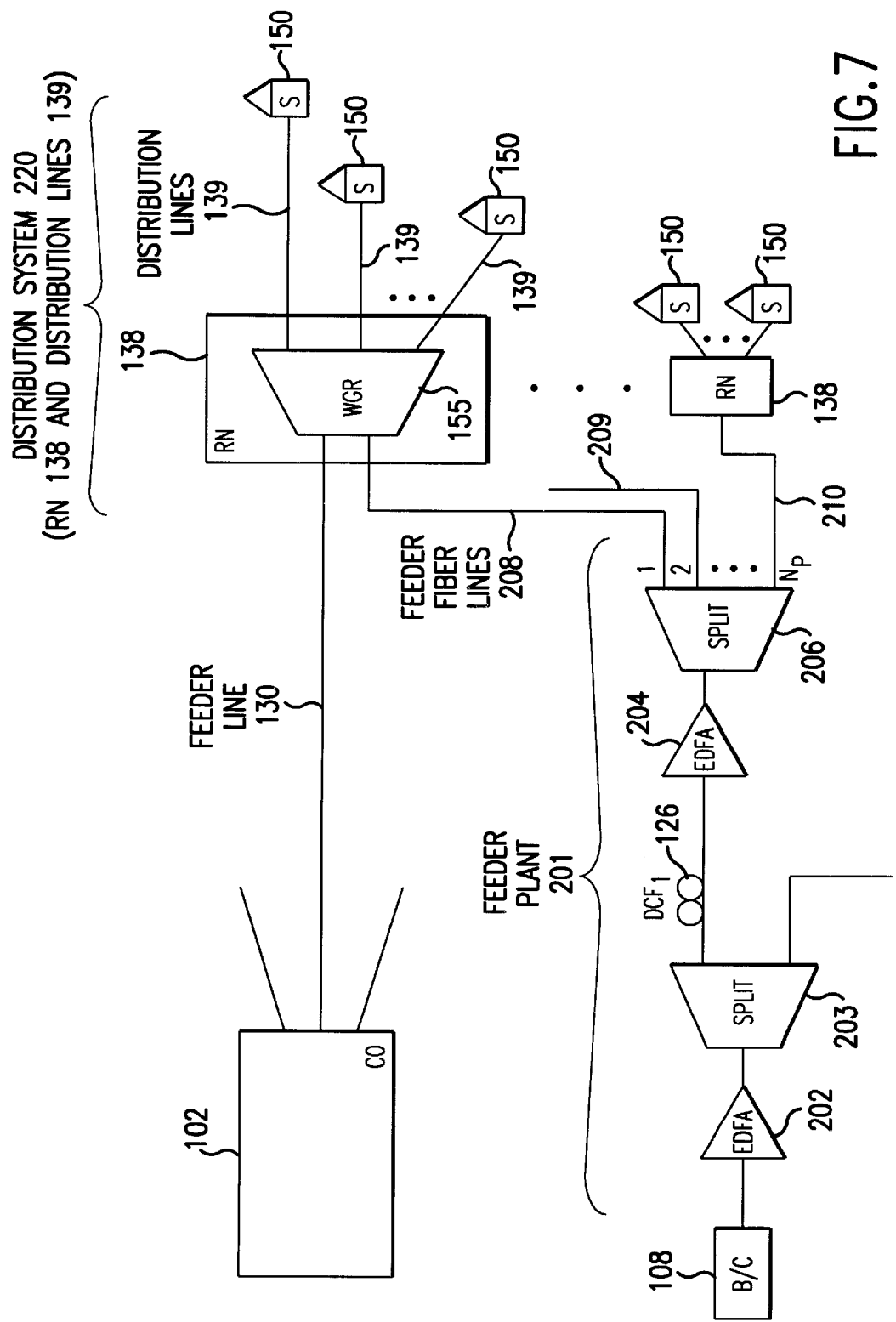
FIG. 7 is a block diagram illustrating a broadcast delivery system according to another embodiment of the present invention.

FIG. 7 is a block diagram illustrating a broadcast delivery system according to another embodiment of the present invention. In this case, another service provider (e.g., a broadcast video service provider) uses its own feeder plant 201, but makes use of the original distribution system 220 (including RN 138 and distribution links or lines 139). The broadcast service provider's feeder plant 201 includes an amplifier 202, such as an Erbium Doped Fiber Amplifier (EDFA), splitter 203, DCF1 (126), amplifier 204 (which may be an EDFA), splitter 206, and feeder fiber lines 208, 209 and 210 output from splitter 206. Each of the feeder lines 208, 209, . . . 210 is connected to a different RN 138. Again, the broadcast service provider groups his feeder fiber lines together based on length to allow one DCF to pre-compensate for the group of feeder lines such that the dispersion penalty of each feeder line is within an acceptable range (e.g., within a predetermined threshold value). In this example, feeder lines 208, 209 and 210 were grouped together based on their substantially similar length and a DCF 126 was selected to pre-compensate each feeder line of this group to an acceptable level. Each DCF 126 can compensate for a range of feeder line lengths or link lengths. Other feeder lines (not shown) may be grouped together based on length and connected to a different splitter (not shown) in parallel with splitter 206, and connected to a corresponding DCF 126 selected to compensate for the range of feeder line lengths of that particular group.

Referring to FIG. 7, the broadband broadcast signal is amplified by amplifiers 202 and 204 and pre-compensated by DCF1. DCF1 pre-compensates feeder lines 208, 209 and 210 together or as a group to reduce the cost per subscriber.

Optical signals from CO 102 are connected to RN 138 via feeder line 130 and are distributed by WGR 155 to subscribers 150 via distribution lines 139. At the same time, the broadcast service provider also uses the "routing" property of the WGR 155 (multiple input ports which connect to output ports on permuted wavelengths) to permit access to the distribution fiber lines 139 without disturbing the CO's feeder lines. This property allows the WGR 155 to spectrally slice the broadcast broadband signal provided via feeder line 208 to each of the subscribers 150. This scheme allows the CO's owner to sell broadcast services (or allow a broadcast service provider to provide broadcast services) over the existing distribution system 220 to subscribers 150, thereby allowing the owner to recoup some of his infrastructure costs or provide an additional source of revenue.

Figure 8:
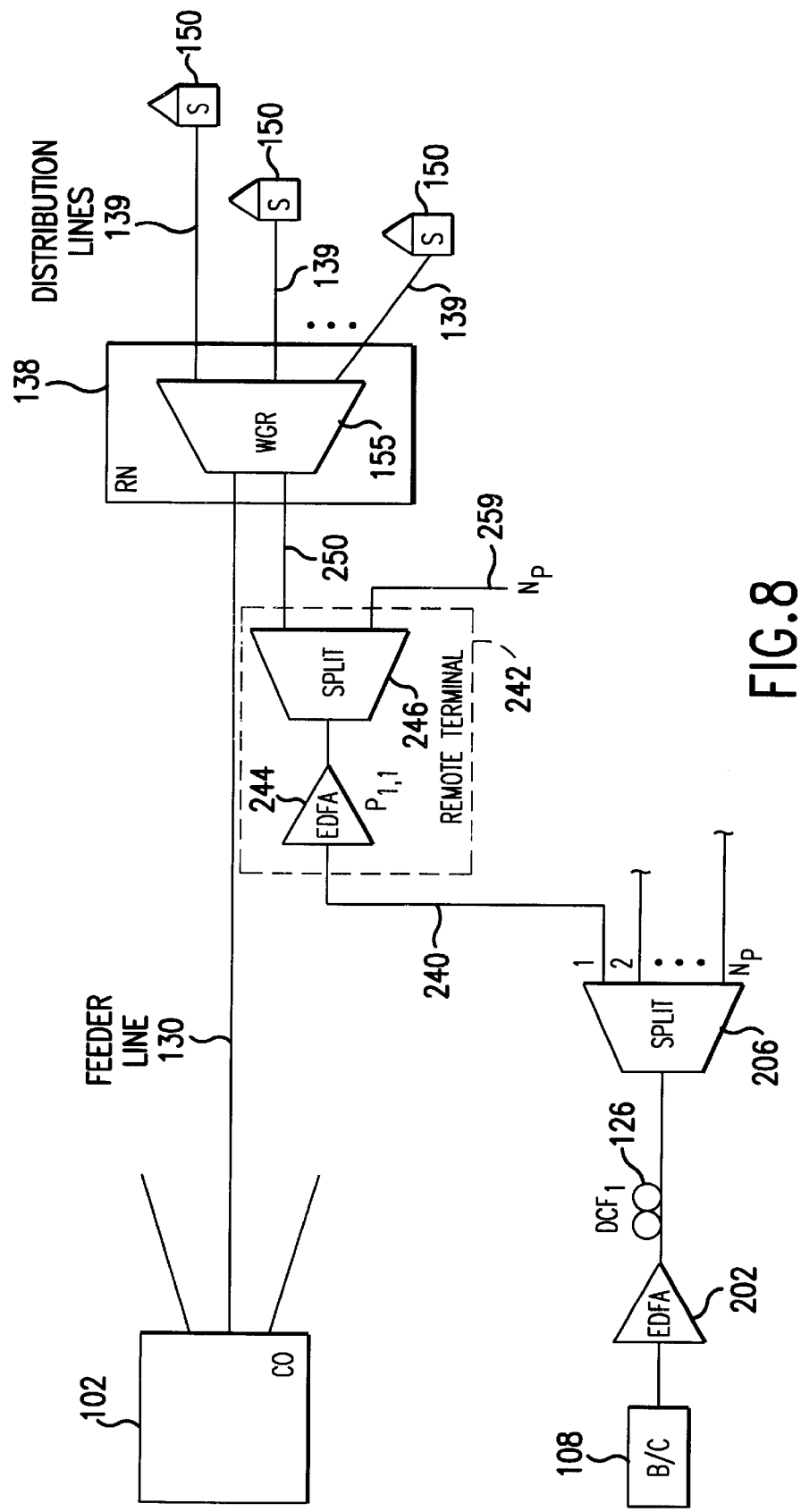
FIG. 8 is a block diagram illustrating a variation of the broadcast delivery system of FIG. 7.

FIG. 8 is a block diagram illustrating a variation of the broadcast delivery system of FIG. 6. The N$_p$ feeder lines (208, 209, . . . 210, FIG. 7) service N$_p$ RNs 138 (only one of the RNs 138 is shown in FIG. 7). In some cases, the service area for the broadcast service provider may be much larger than the service area for the network operator, since the absence of transmission equipment, switching, and line monitoring makes the broadcast service intrinsically easier to provide. At some feeder fiber length, the cost of installing and maintaining multiple feeder fibers with long lengths will become more expensive than operating a remote terminal fed by a single feeder. Thus, in the embodiment of FIG. 8, the N$_p$ long feeder lines (208, 209, . . . 210) shown in FIG. 7 are replaced with one long feeder line 240, a remote terminal 242, and N$_p$ shorter feeder lines 250, . . . 259. The remote terminal 242 includes an amplifier (such as an EDFA) 244 and a splitter 246 (or a plurality of splitters). The short feeder lines 250, . . . 259 are provided as outputs from the splitter 246. The N$_p$ short feeder lines 250, . . . 259 serve N$_p$ RNs 138. This embodiment provides an economical alternative when the cost of constructing and powering the remote terminal 242 is less than the cost of the N$_p$ long feeder fibers that it replaces.

Figure 9:
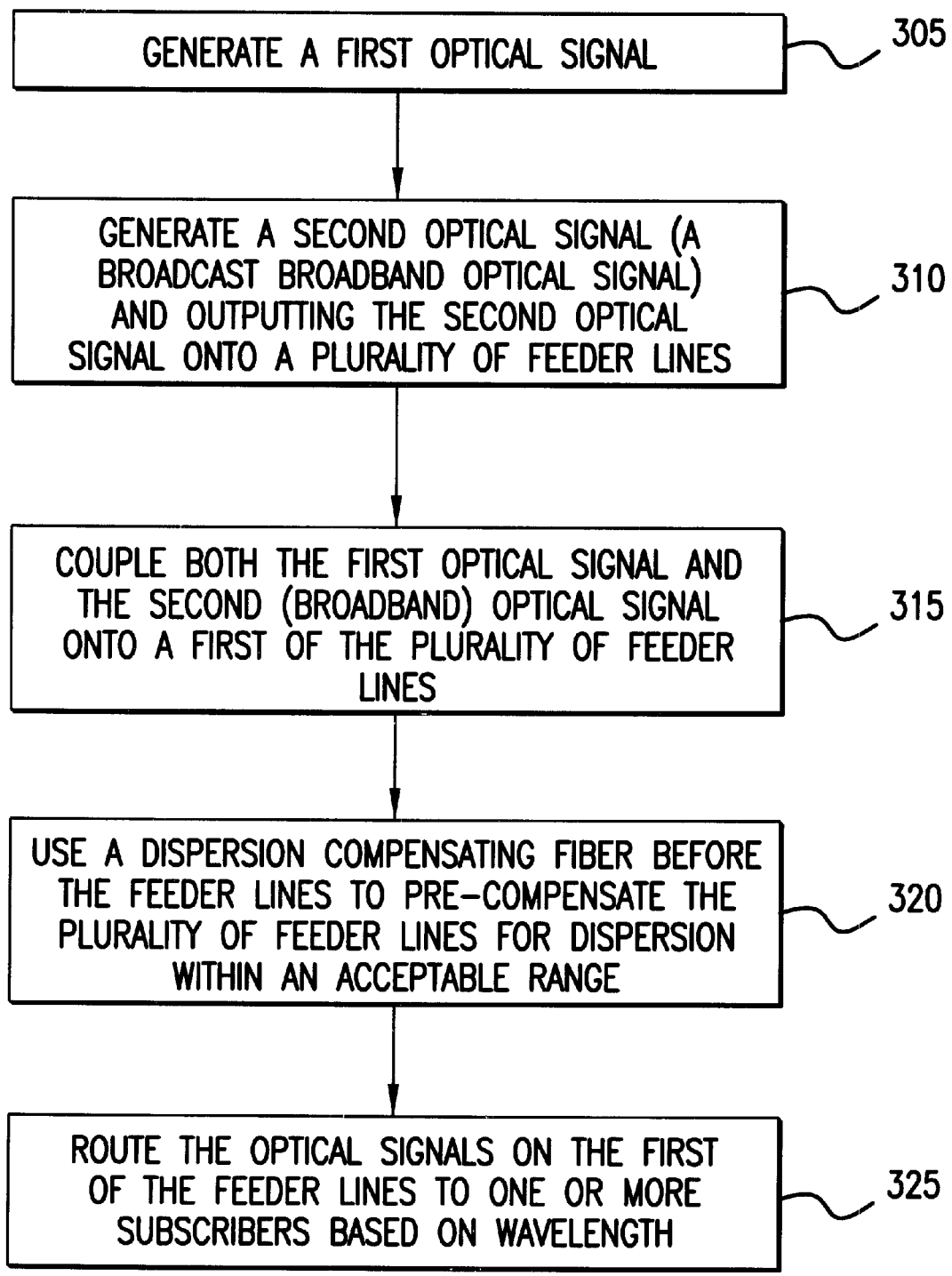
FIG. 9 is a flow chart illustrating operation of a broadcast delivery system according to an embodiment of the present invention.

FIG. 9 is a flow chart illustrating operation of a broadcast delivery system according to an embodiment of the present invention. The method of FIG. 9 generally corresponds to the system of FIG. 6 (but not necessarily exactly). Referring to FIGS. 6 and 9, at step 305, a first optical signal is generated by a PON terminal equipment 104 (PON1 terminal equipment).

At step 310, a second optical signal is generated by a broadcast broadband optical source 108. The second optical (broadband) signal output from broadcast source 108 is output via splitters 112 and 118 (and other components) to a plurality of feeder lines 130, 131, etc.

At step 315, the first optical signal and the second optical (broadband) signal are connected or combined by coupler 127 onto a first of the feeder lines.

At step 320, a DCF fiber 126 (e.g., DCF1) is used to compensate the plurality of feeder lines for dispersion compensation within an acceptable range.

At step 325, the WGR 155 within RN1 138 selectively routes or distributes both the first optical signal and the second (broadband) optical signal to subscribers based on wavelength. According to one example, the RN 138 (RN1) routes the first optical signal (e.g., a narrowband signal from a line source) to a selected subscriber(s). RN1 138 also spectrally slices the second (broadband) optical signal into a plurality of second signal portions (or spectral components). Each second signal portion includes the same information output from the broadcast source 108, but at different frequencies. RN1 then routes or the second signal portions to subscribers 150 based on the wavelength of each second signal portion (providing the broadcast of the second signal). If the first optical signal is a broadband signal, RN1 will similarly spectrally slice and route the signal portions or spectral components of the first signal in the same manner.

Figure 10:
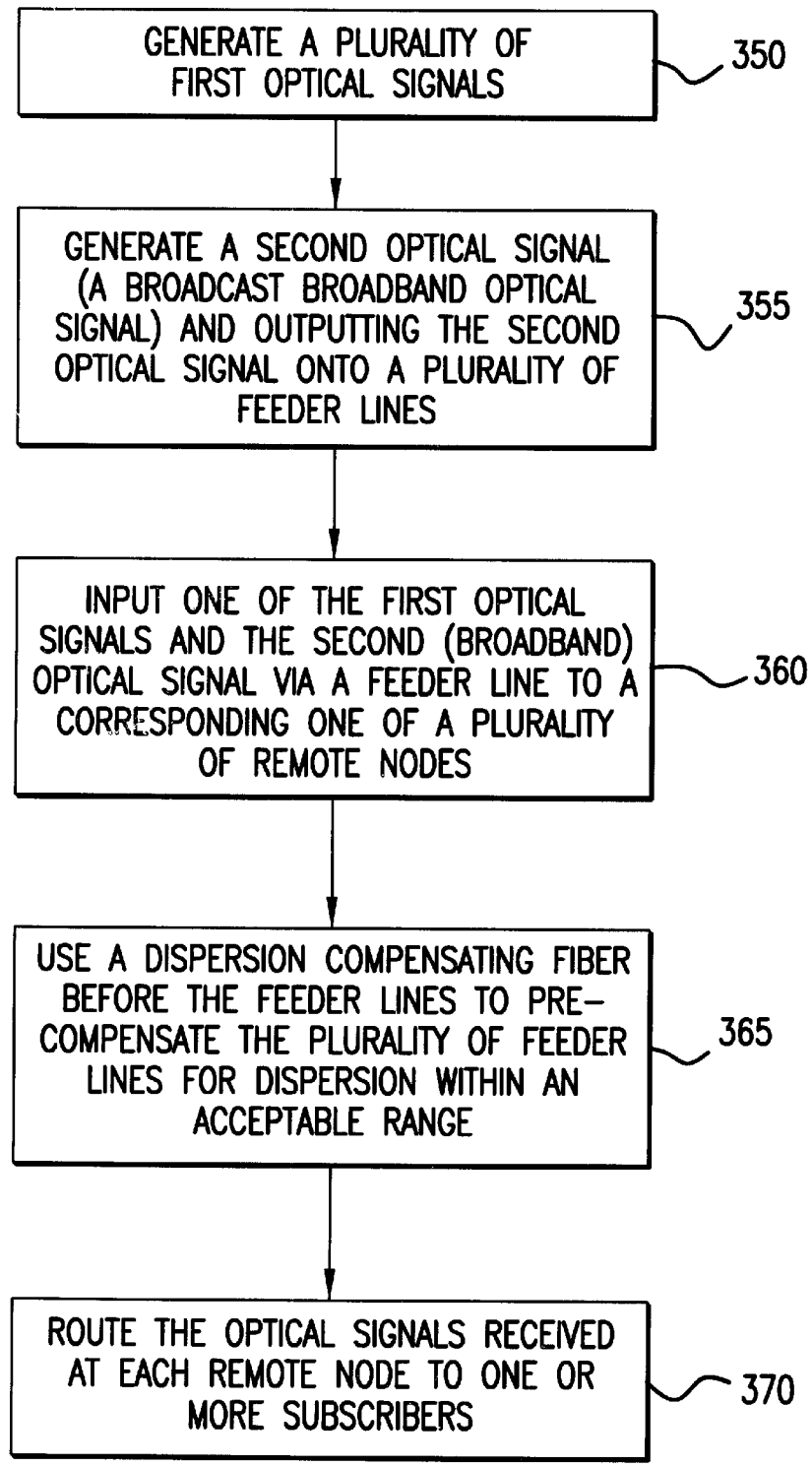
FIG. 10 is a flow chart illustrating operation of a broadcast delivery system according to another embodiment of the present invention.

FIG. 10 is a flow chart illustrating operation of a broadcast delivery system according to another embodiment of the present invention. The method of FIG. 10 may generally (but not necessarily exactly) correspond to the system of claim 7.

Referring to FIGS. 6 and 9, at step 350, one or more optical sources (such as optical transmitters within PONs 104 of CO 102, FIGS. 5 and 6) within CO 102 generate a plurality of first optical signals.

At step 355, a second (broadcast broadband) optical signal is generated by broadcast source 108. The second optical signal is output by splitter 206 (FIGS. 6 or 7) onto a plurality of feeder lines 208, 209, . . . 210.

At step 360, one of the first optical signals (output from CO 102) is input to RN 138 via feeder line 130. Also, the second (broadband) optical source is input to RN 138 via feeder line 208.

At step 365, a DCF 126 (i.e., DCF1) is provided before the feeder lines 208, 209, . . . 210 to pre-compensate these feeder lines for dispersion within an acceptable range. To allow the group of feeder lines (208, 209, etc.) to be compensated within an acceptable range by one DCF, the feeder lines (208, 209, 210, . . . ) should be grouped together based on each feeder line having a sufficiently similar length to each other (within a range of a specified length).

At step 370, the WGR 155 (FIG. 5) within the RN1 138 routes the optical signals (including the first and second optical signals) to one or more subscribers 150 based upon wavelength.

As described above, the broadcast delivery system of the present invention allows the delivery of broadband broadcast services over a WDM Passive Optical Network. These services can be carried on optical broadband carriers or signals in a cost-effective manner by utilizing shared dispersion-compensated fiber (DCF) over a group of feeder lines or a group of PONs. Transport of these broadcast services permits additional income streams to accrue to a network provider and gives access to broadcast service providers that would otherwise carry an inordinately high barrier to entry. The services can be delivered through the network operator's hub and feeder plant or through an independent feeder plant.

Several embodiments of the present invention are specifically illustrated and/or described herein. However, it will be appreciated that modifications and variations of the present invention are covered by the above teachings and within the purview of the appended claims without departing from the spirit and intended scope of the invention. For example broadcast source 108 can be replaced with multiple broadcast sources that are connected to splitter 112. Also, the broadcast source 108, can provide different information or signals at different spectral ranges, and each of the power splitters could be replaced with a WDM device.

What is claimed is:

1. A broadcast delivery system comprising:
 a plurality of passive optical networks (PONs), each passive optical network including at least an optical transmitter and a feeder line connected thereto;
 a broadband optical source outputting a broadband optical signal; and
 a dispersion compensating fiber having a first end connected to the broadband optical source and a second end connected to each of the plurality of PONs upstream of the feeder lines, the dispersion compensating fiber for dispersion compensating the broadband optical signal for each of the feeder lines in the plurality of PONs within an acceptable range, whereby further dispersion compensation of the broadband optical signal is not required downstream of the feeder lines.

2. The broadcast delivery system of claim 1 wherein the second end of said dispersion compensating fiber is connected via at least one other optical component to the plurality of PONs.

3. The broadcast delivery system of claim 2, said at least one other optical component comprising a splitter, wherein the second end of said dispersion compensating fiber is connected to an input of the splitter, and each of a plurality of outputs of the splitter are connected to one of the feeder lines.

4. The broadcast delivery system of claim 1 and wherein each said PONs further comprises a remote node connected to each of the feeder lines, the remote node receiving both an optical signal from the optical transmitter and the dispersion-compensated broadband optical signal from the broadband optical source via one of the feeder lines.

5. The broadcast delivery system of claim 4 wherein the remote node comprises a wavelength division multiplexing (WDM) device having an input coupled to one of the feeder lines, the WDM device having at least one output connected to a subscriber.

6. The broadcast delivery system of claim 5 wherein said WDM device comprises a waveguide grating router.

7. A broadcast delivery system comprising:
 a first optical source having a first output for outputting a broadcast broadband optical signal;
 a dispersion compensating fiber having an input connected to the first output for receiving the broadcast broadband optical signal from the first optical source;
 a plurality of feeder lines each having a first end connected to an output of the dispersion compensating fiber, the dispersion compensating fiber for dispersion-compensating each of the plurality of feeder lines within an acceptable range;
 a plurality of second optical sources, each having a second output for outputting a second optical signal to a corresponding feeder line;
 a plurality of remote nodes, each having an input connected to a second end of its corresponding feeder line and each further having a plurality of remote node outputs, each remote node output coupled to a subscriber, whereby further dispersion compensation of the broadcast broadband optical signal is not required downstream of the first end of the feeder lines.

8. The broadcast delivery system of claim 7 wherein said remote node comprises a wavelength division multiplexing (WDM) device.

9. The broadcast delivery system of claim 7 wherein said remote node comprises a waveguide grating router.

10. The broadcast delivery system of claim 7 wherein each said second optical sources comprises a laser.

11. The broadcast delivery system of claim 7, wherein the first optical signal provides a first service and each second optical signal provides at least a second service to a subscriber.

12. A method of delivering broadcast services over a wavelength division multiplexed optical network, the method comprising:
 generating a first optical signal;
 generating a second optical signal, the second optical signal being a broadcast broadband optical signal output on a plurality of feeder lines;
 coupling both the first optical signal and the second optical signal onto a first of the feeder lines;
 using a dispersion compensating fiber upstream from the plurality of feeder lines to pre-compensate a dispersion of the second optical signal for each of the plurality of feeder lines within an acceptable range; and
 routing the first and second optical signals on the first of the feeder lines to one or more subscribers based on wavelength, whereby further dispersion compensation of the second optical signal is not required downstream from the plurality the feeder lines.

13. The method of claim 12 wherein said routing further comprises:
 routing the first optical signal to one or more selected subscribers based on the wavelength of the first optical signal; and
 routing the dispersion compensated second optical signal to all subscribers connected to the plurality of feeder lines.

14. The method of claim 13 wherein said step of routing the dispersion compensated second optical signal further comprises:
  spectrally slicing the second optical signal into a plurality of second optical signal portions, each second optical signal portion including the same information at a different wavelength; and
  routing each second optical signal portion to one or more subscribers based on the wavelength of the second optical signal portion.

15. The method of claim 12 wherein the first optical signal delivers a first service to one or more selected subscribers and the second optical signal broadcasts a second service to all subscribers.

16. The method of claim 12 and further comprising:
  grouping the plurality of feeder lines together based upon a similarity in a length of each of the feeder lines.

17. The method of claim 16 wherein said grouping further comprises:
  grouping the plurality of feeder lines together based on length such that the dispersion compensating fiber will dispersion compensate all of the group of feeder lines within an acceptable range.

18. The method of claim 12 and further comprising:
  using a common amplifier to amplify the second optical signal for the plurality of feeder lines.

19. A method of delivering broadcast services over a wavelength division multiplexed optical network, the method comprising:
  generating a plurality of first optical signals for transmission to particular subscribers;
  generating a second optical signal for transmission over a plurality of feeder lines, the second optical signal being a broadcast broadband optical signal for transmission to a plurality of subscribers including the particular subscribers;
  coupling at least one of the plurality of first optical signals and the second optical signal on one of the feeder lines for transmission to a remote node;
  using a dispersion compensating fiber upstream from the plurality of feeder lines to pre-compensate a dispersion of the second optical signal within an acceptable range, the dispersion compensating fiber having a one-to-many relationship with the feeder lines;
  routing the coupled optical signals from the remote node to at least one of the particular subscribers based on wavelength, whereby further dispersion compensation of the second optical signal is not required downstream of the feeder lines.

20. A method for delivering broadcast services over a wavelength division multiplexed optical network, the method comprising:
  providing a first service to at least one subscriber by transmitting a first optical signal over a plurality of passive optical networks, each passive optical network including a feeder line between an optical source and a plurality of subscribers;
  providing a broadcast service to the plurality of the subscribers by transmitting a broadband optical signal over the plurality of passive optical networks; and
  dispersion-compensating the broadband optical signal for a plurality of the feeder lines using a shared dispersion-compensated fiber disposed upstream of the plurality of feeder lines, whereby further dispersion compensation of the broadband optical signal is not required downstream of the feeder lines.

* * * * *